United States Patent
Lee et al.

(10) Patent No.: US 7,801,252 B2
(45) Date of Patent: Sep. 21, 2010

(54) APPARATUS AND METHOD FOR CHANNEL ESTIMATION FOR DATA DEMODULATION IN BROADBAND WIRELESS ACCESS SYSTEM

(75) Inventors: Seo-Goo Lee, Anyang-si (KR); Tae-Gon Kim, Seoul (KR); Min-Cheol Park, Suwon-si (KR); Yun-Sang Park, Suwon-si (KR); Bong-Gee Song, Seongnam-si (KR); In-Hyoung Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 842 days.

(21) Appl. No.: 11/710,852

(22) Filed: Feb. 26, 2007

(65) Prior Publication Data

US 2007/0211832 A1    Sep. 13, 2007

(30) Foreign Application Priority Data

Feb. 24, 2006   (KR) .................... 10-2006-0018042

(51) Int. Cl.
*H03D 1/00* (2006.01)
*H04L 27/06* (2006.01)

(52) U.S. Cl. .................. 375/340; 375/346; 375/285; 375/260; 375/342; 455/63.1; 455/296

(58) Field of Classification Search ........... 375/340, 375/346, 285, 316, 342, 260; 455/63.1, 296
See application file for complete search history.

(56) References Cited

U.S. PATENT DOCUMENTS 7,180,965 B2 *  2/2007  Eilts et al. ............... 375/340
2003/0058951 A1  3/2003  Thomson et al.

2003/0086508 A1  5/2003  Magee

FOREIGN PATENT DOCUMENTS

JP    2002-164865    6/2002
JP    2003-264529    9/2003

(Continued)

OTHER PUBLICATIONS

Heejung Yu et al., "Carrier Frequency and Timing Offset Tracking Scheme for SC-FDE Systems", The 14$^{th}$ IEEE 2003 International Symposium on Personal, Indoor and Mobile Radio Communication Proceedings, Sep. 7-10, 2003.

*Primary Examiner*—Phuong Phu
(74) *Attorney, Agent, or Firm*—The Farrell Law Firm, LLP

(57) ABSTRACT

Provided is a channel estimation apparatus and method. In the channel estimation apparatus, a channel estimator performs channel estimation onto a received symbol and output a channel estimation result. The channel estimation result is stored in an estimation buffer along with a channel estimation result compensated in a preamble phase compensator. The preamble phase compensator receives a channel estimation result for pilot subcarriers of a data symbol and a preamble channel estimation result from the estimation buffer, acquires a phase rotation value between them, and compensates the preamble channel estimation result with the phase rotation value. When FCH and DL-MAP are demodulated, pilot subcarriers in the N$^{th}$ PUSC symbol have been used to estimate the channel of the Nth PUSC symbol.

28 Claims, 5 Drawing Sheets

FOREIGN PATENT DOCUMENTS

| | | |
|---|---|---|
| JP | 2004-064587 | 2/2004 |
| JP | 2004-072469 | 3/2004 |
| JP | 2004-159138 | 6/2004 |
| JP | 2006-014321 | 1/2006 |
| JP | 2007-180618 | 7/2007 |
| KR | 100718607 | 5/2007 |
| WO | WO 00/65756 | 11/2000 |

* cited by examiner

APPARATUS AND METHOD FOR CHANNEL ESTIMATION FOR DATA DEMODULATION IN BROADBAND WIRELESS ACCESS SYSTEM

PRIORITY

This application claims priority under 35 U.S.C. §119 to an application filed in the Korean Intellectual Property Office on Feb. 24, 2006 and assigned Serial No. 2006-18042, the contents of which are incorporated herein by reference.

BACKGROUND OF THE INVENTION

1. Field of the Invention

The present invention relates generally to channel estimation in a broadband wireless access system, and in particular, to a channel estimation apparatus and method for demodulating frame control headers (FCH) and downlink-MAP (DL-MAP) in a user terminal in a broadband wireless access system.

2. Description of the Related Art

Researchers are studying the fourth-generation (4G) communication systems, which are the next-generation communication systems, to provide users with services having diverse qualities of service (QoS) at a transmission rate of about 100 Mbps.

Particularly, current 4G communication systems include a broadband wireless access communication system, such as a Local Area Network (LAN) system and a Metropolitan Area Network (MAN), secured with mobility and QoS, and which aim to provide services at a high data transmission rate. One of the representative communication systems is an Institute of Electrical and Electronics Engineers (IEEE) 802.16 communication system. The IEEE 802.16 communication system adopts an Orthogonal Frequency Division Multiplexing (OFDM)/Orthogonal Frequency Division Multiple Access (OFDMA) scheme to support a broadband service network in a physical channel in the wireless MAN system.

The OFDM technology is a wireless communication method using multiple carriers, and it is highly efficient with respect to frequency and has a high data transmission rate, compared to a conventional communication system using a single carrier. Since data symbols are transmitted in a frequency domain according to each subcarrier in the OFDM system, there is an advantage in that compensation in a wireless channel environment is simplified into 1-tap equalization.

The wireless channel environment varies according to time in the OFDM system secured with mobility, such as the IEEE 802.16 system, and the channel estimation method should be able to track the time-varying channel ceaselessly. The time-varying channel is estimated mainly by transmitting signals of which a receiving part is already aware through subcarriers for some pilots of OFDM symbols. In this case, a channel for subcarriers that carry actual data is estimated by performing interpolation using the pilots.

In the IEEE 802.16 system, information on one downlink frame is stored in a frame control header (FCH) and downlink-MAP (DL-MAP) disposed in the foremost part of the downlink frame and then transmitted.

FIG. 1 illustrates a conventional downlink frame demodulation in a broadband wireless access system.

Referring to FIG. 1, an FCH is disposed in the foremost part of a downlink frame. In other words, a FCH is disposed at a fixed position with the same length and modulation scheme (such as Quadrature Phase Shift Keying (QPSK) 1/12) of the first Partial Use of Subchannel (PUSC) symbol behind a preamble so that it can be demodulated even through a user terminal does not have information on the received frame, such as the structure, data burst location, and length of the frame.

The DL-MAP is disposed right behind the FCH. The length of the DL-MAP and a modulation rate are variable, and information on them is included in the FCH. The user terminal determines the demodulation parameters for DL-MAP by demodulating the FCH that is allocated to a predetermined position in the fore part of a frame at a predetermined Modulation and Coding Scheme (MCS) level, and actually figures out the zone information of the entire frame, length and location of the data burst, and demodulation information by demodulating the DL-MAP based on the demodulation parameters. Therefore, failure in demodulation of FCH or DL-MAP leads to failure of the entire frame demodulation.

The demodulation of FCH and DL-MAP is affected by synchronization and channel estimation. The channel estimation is carried out using a preamble or pilot subcarriers for a PUSC symbol. The channel estimation based on the pilot subcarriers includes a Least-Square (LS) method or a Linear Minimum Mean Square Estimation (LMMSE) method. The LS method is generally used due to its simplicity although it has inferior performance to the LMMSE method.

Excellent channel estimation performance requires synchronization in time and frequency. When time is not synchronized and the starting point of a symbol is determined posterior to a guard interval, Inter-Symbol Interference (ISI) occurs and it deteriorates the channel estimation performance. In the case of the frequency synchronization, when a frictional frequency offset which is decimal-time as long as a subcarrier interval occurs, the inter-symbol interference also occurs based on the frequency offset, which leads to deteriorated performance of channel estimation.

In general environments, it is impossible to accurately synchronize time and frequency due to a time-varying channel and Additive White Gaussian Noise (AWGN), and offset occurs more or less always. However, the channel estimation performance may not be affected by determining the starting point of a symbol in a guard interval in the case of time synchronization, and a residue frequency offset which is less than 1% of a subcarrier interval in the case of frequency synchronization.

FIG. 2 illustrates conventional structures of a preamble and PUSC symbols in a broadband wireless access system FIG. 2 shows 1024-tab Fast Fourier Transform (FFT) used in a PUSC symbol including the FCH and the DL-MAP.

In the case of the preamble, one pilot subcarrier is transmitted for every third subcarrier. In the case of the PUSC symbol, two pilot subcarriers are transmitted for every 14 consecutive subcarriers, and the location of a pilot subcarrier is changed on a two-symbol basis.

The 14 consecutive subcarriers and the two symbols are grouped and referred to as a cluster. Also, the pilot subcarriers included in the preamble are boosted with power of 9 dB, whereas the pilot subcarriers disposed in a PUSC symbol using a frequency reuse factor 1 are boosted with power of 2.5 dB.

Since the preamble has higher pilot density and signal-to-noise ratio (SNR) than the PUSC symbol, the channel is estimated better in the preamble than in the data symbol. Also, a noise reduction filter for improving channel estimation performance cannot be used for the first two PUSC symbols that include the FCH and the DL-MAP. This is because the frequency reuse factor of the two PUSC symbols is not known until the FCH is demodulated.

The frequency reuse factor is determined based on whether the subcarriers of the PUSC symbol are used in the current frame (which is a case of a frequency reuse factor 1) or whether only part of the subcarriers are used among the subcarriers (which is a case of a frequency reuse factor 3). In the latter case where only part of the subcarriers are used (a frequency reuse factor 3), noise reduction filtering cannot be performed because a cluster in the middle part is transmitted without pilots and data.

Zone boosting deteriorates channel estimation performance for the PUSC symbol disposed in the fore part of a frame. With zone boosting, the voltage of the pilots differs according to the frequency reuse factor of the PUSC symbol. As described above, the frequency reuse factor of the first two PUSC symbols can be known only when the FCH is normally demodulated. Thus, time interpolation used to improve the channel estimation performance cannot be used for the preamble and the subsequent two symbols which are transmitted in a fixed power level. Therefore, the demodulation performance is better when a channel estimation value obtained using a preamble is used for the demodulation of the FCH and the DL-MAP than when a channel estimation value obtained by using pilot subcarriers of a PUSC symbol including the FCH and the DL-MAP.

However, the influence of a residue frequency offset appears in the form of inter-symbol interference and phase rotation in the frequency domain, which is accumulated as time passes. Since the influence of the inter-symbol interference is relatively small, only the deterioration in performance caused by the phase rotation will be considered herein. A value of phase rotation becomes larger and it is accumulated on a symbol basis. A symbol has the same rotation value for all subcarriers.

In other words, when there is a residue frequency offset, a channel estimation value obtained using a preamble has a different phase from a channel estimation value obtained using pilots of PUSC symbols in the fore part of a frame that are transmitted subsequently. Thus, when the channel estimation value obtained using a preamble is used for the demodulation of the FCH and the DL-MAP, channel estimation performance deteriorates due to the phase rotation. To sum up, when the channel estimation value obtained using the preamble is applied to the demodulation of the FCH and the DL-MAP, there is an advantage with respect to the SNR, compared to using the channel estimation value obtained using the pilots of the PUSC symbols in the fore part of the frame. However, when the residue frequency offset is considered, there is little advantage due to the phase rotation.

Also, in order to apply the channel estimation value obtained using the preamble to the PUSC symbols in the fore part of the frame, not only the phase rotation but also the effects on the time-varying characteristic of a wireless channel environment should be taken into consideration. In short, up to what symbol apart from the preamble in the sequence of symbols the channel estimation value obtained using the preamble should be applied to is determined based on the coherence time of a channel. When the channel estimation value obtained using the preamble is applied to symbols corresponding to time longer than the coherence time of a channel, the change of the channel caused by time affects more than the phase rotation and deteriorates the performance.

When DL-MAP and data burst have the same length and are demodulated in the same method, i.e., Quadrature Phase Shift Keying (QPSK) 1/12 and their demodulation performance is compared, the demodulation performance of the DL-MAP is inferior. Therefore, it is required to develop an efficient channel estimation method that has the advantage of the channel estimation method demodulating FCH and DL-MAP using a preamble and the advantage of the channel estimation method demodulating the FCH and DL-MAP using pilot subcarriers disposed in the PUSC symbols in the fore part of a frame.

SUMMARY OF THE INVENTION

An aspect of the present invention is to substantially solve at least the above problems and/or disadvantages and to provide at least the advantages below. Accordingly, an aspect of the present invention is to provide a channel estimation apparatus and method that can improve demodulation performance of a frame control header (FCH) and downlink-MAP (DL-MAP) using an advantage of a channel estimation method using a preamble and a channel estimation method using pilot subcarriers disposed in Partial Use of Subchannel (PUSC) symbols in the fore part of a frame in a broadband wireless access system.

According to one aspect of the present invention, a channel estimation apparatus in a broadband wireless communication system includes a channel estimator, an estimation buffer, and a preamble phase compensator. The channel estimator performs channel estimation onto a received symbol to thereby output a channel estimation result. The estimation buffer stores the channel estimation result obtained in the channel estimator and a channel estimation result that is compensated in a preamble phase compensator. The preamble phase compensator receives a channel estimation result for pilot subcarriers of a data symbol among the channel estimation result obtained in the channel estimator, receives a preamble channel estimation result from the estimation buffer, acquires a phase rotation value between the channel estimation result for pilot subcarriers and the preamble channel estimation result, compensates the preamble channel estimation result with the phase rotation value, and stores the compensated preamble channel estimation result in the estimation buffer.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
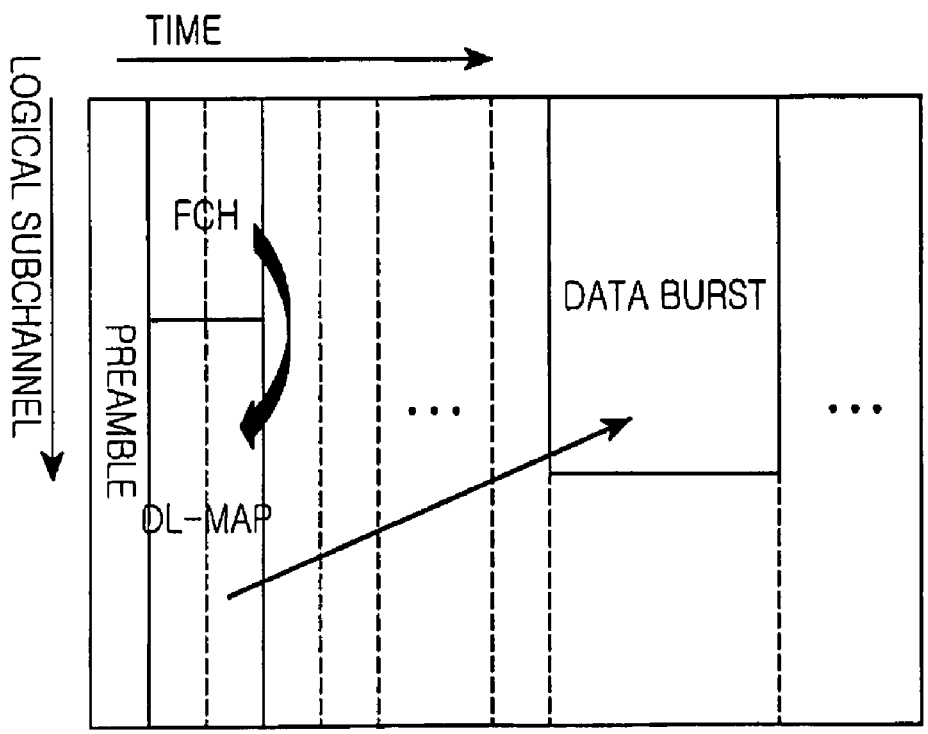
FIG. 1 illustrates a conventional downlink frame demodulation in a broadband wireless communication system.
Figure 2:
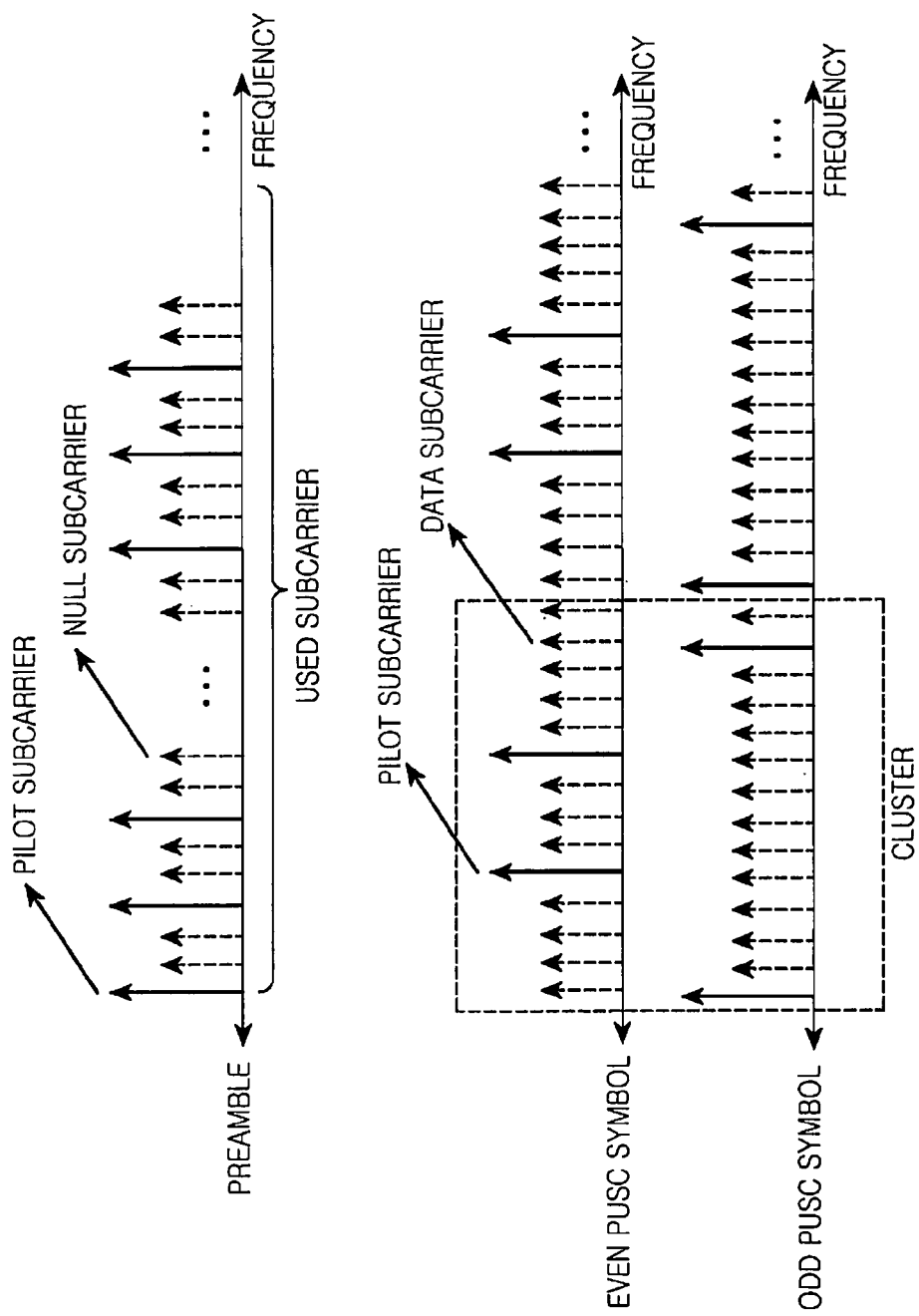
FIG. 2 illustrates a conventional structure of a preamble and Partial Use of Subchannel (PUSC) symbols in a broadband wireless communication systems.

Preferred embodiments of the present invention will be described herein below with reference to the accompanying drawings. In the following description, well-known functions or constructions are not described in detail since they would obscure the invention in unnecessary detail.

The channel estimation apparatus and method for demodulation of the present invention, has an advantage of a channel estimation method using a channel estimation value of a preamble to demodulate a frame control header (FCH) and downlink-MAP (DL-MAP) and an advantage of a channel estimation method using a channel estimation value obtained based on pilot subcarriers disposed in the PUSC symbols in the fore part of a frame. In other words, the channel estimation apparatus and method of the present invention demodulates the FCH and the DL-MAP by compensating for only a phase difference between a channel estimation value of a high signal-to-noise ratio (SNR) obtained based on a preamble and a channel estimation value obtained based on PUSC symbols in the fore part of a frame.

To describe the method, channel estimation is performed using an input preamble to thereby produce a channel estimation value, which is stored in a buffer. Subsequently, when the first PUSC symbol is input, channel estimation is performed for pilot subcarriers disposed in the first PUSC symbol based on a simple Least Square (LS) estimation expressed as the following Equation (1).

$$\hat{H}_{LS} = X^{-1} Y \quad (1)$$

where X denotes a value of pilot subcarriers which a receiving part is already aware of; and Y denotes a value that is received through the pilot subcarriers.

A phase difference between the channel estimation value obtained based on the preamble and the channel estimation value obtained based on the pilot subcarriers in the first PUSC symbol is acquired based on the following Equation (2) by performing complex conjugate multiplication on the channel estimation value for the pilot subcarriers of the first PUSC symbol obtained based on Equation (1) and a channel estimation value for the pilot subcarriers of a preamble that is already stored in the buffer $$\hat{\theta} = \angle \hat{H}^*_{preamble} \hat{H}_{1st} \quad (2)$$

A phase difference value that minimizes a deviation caused due to noise and a time-varying characteristic can be acquired by individually operating a real part and an imaginary part as shown in Equation (3) based on the phase difference obtained based on Equation (2) for the pilot subcarriers disposed in the first PUSC symbol.

$$\hat{\theta} = \angle \sum_{p=0}^{119} \hat{H}^*_{preamble,p} \hat{H}_{1st,p} \quad (3)$$

In the phase difference value obtained based on Equation (3), the deviation caused by noise and the time-varying characteristic is the minimum, and only a phase rotation component caused by a residue frequency offset that is applied to the subcarriers identically appears dominantly. The phase difference value obtained based on Equation (3) is used as an input parameter in Equation (4).

$$\hat{H}_{comp} = \hat{H}_{preamble} e^{j\hat{\theta}} \quad (4)$$

Equation (4) compensates for a phase difference of the preamble channel used to estimate the channel of the first PUSC symbol using the phase difference value obtained in Equation (3).

A complex conjugate multiplication is performed based on the following Equation (5A) on the channel estimation value for the pilot subcarriers of the $N^{th}$ PUSC symbol obtained based on Equation (1) and the channel estimation value for the pilot subcarriers of the preamble, which has been stored in the buffer, and the phase difference value between the channel estimation value for the pilot subcarriers of the preamble and the channel estimation value for the pilot subcarriers of the $N^{th}$ PUSC symbol is acquired based on the following Equation (5B). In the $N^{th}$ PUSC symbol above, the extension controller which will be explained later decides "N" value. The "N" value is natural number and represents PUSC symbol number.

$$\hat{\theta} = \angle \hat{H}^*_{preamble} \hat{H}_{N^{th}} \quad (5A)$$

$$\hat{\theta} = \angle \sum_{p=0}^{119} \hat{H}^*_{preamble,p} \hat{H}_{N^{th},p} \quad (5B)$$

where H denotes a channel matrix

Phase compensation is performed based on Equation (4) by using the phase difference value obtained based on Equations (5A) and (5B).

A phase-compensated channel estimation value is stored in the buffer again, and used to demodulate the FCH and the DL-MAP in a subsequent demodulator.

Meanwhile, a normal channel estimation process is carried out from the $(N+1)^{th}$ symbol in the sequence of symbols. This is because the phase difference from the preamble is too large to apply the above process to the $(N+1)^{th}$ symbol, too.

Figure 3:
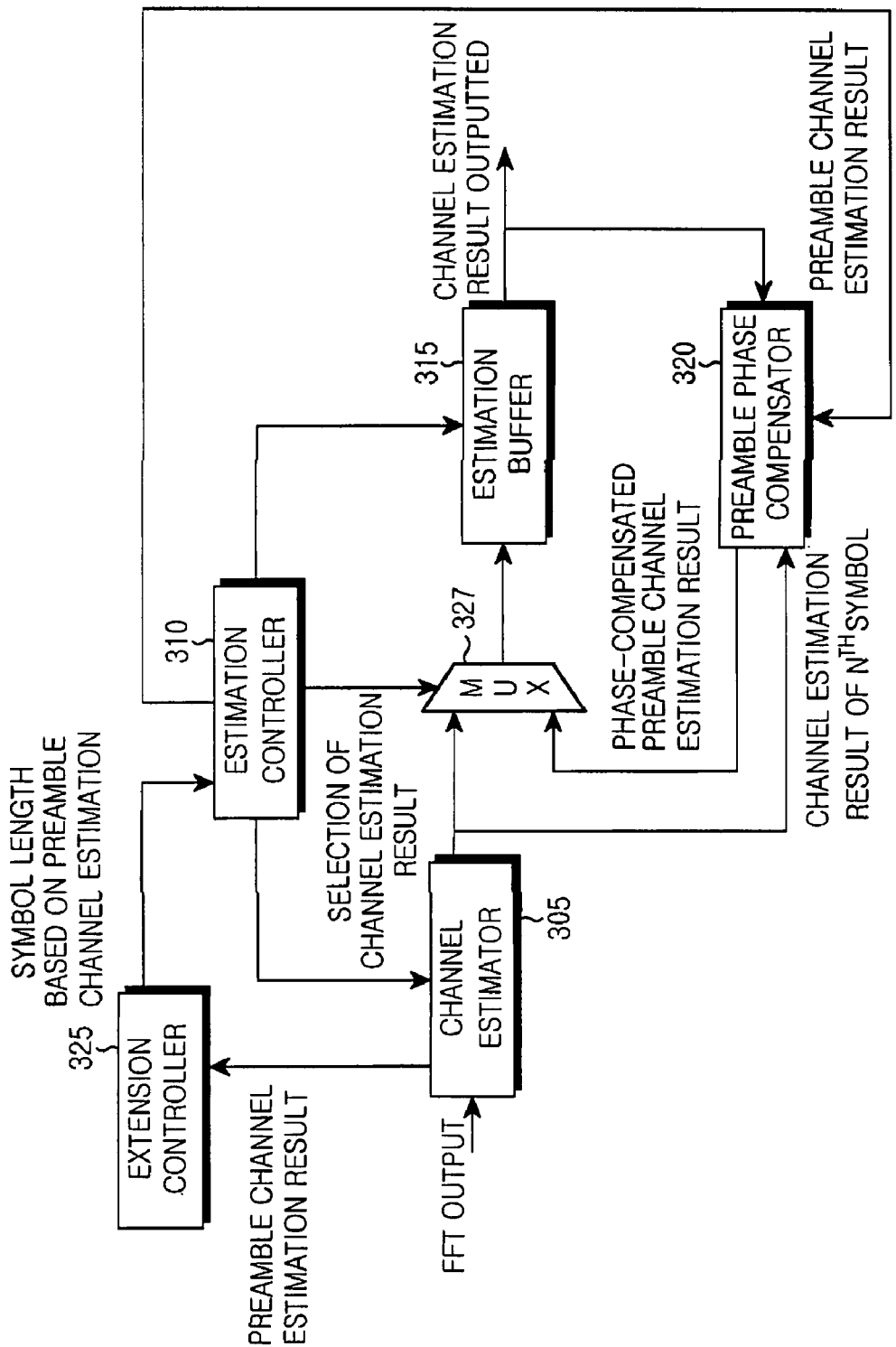
FIG. 3 illustrates a block view of a channel estimation apparatus demodulating a preamble and PUSC symbols in a broadband wireless communication system according to the present invention.

FIG. 3 is a block diagram showing a channel estimation apparatus demodulating preambles and PUSC symbols in a broadband wireless communication system according to the present invention.

Referring to FIG. 3, a channel estimator 305 performs channel estimation for a preamble and the pilot subcarriers of a PUSC symbol.

An estimation buffer 315 stores a channel estimation value of the preamble and a compensated preamble channel estimation value.

A preamble phase compensator 320 acquires a phase rotation value based on the preamble channel estimation value and a channel estimation value for the pilot subcarriers of the $N^{th}$ PUSC symbol that uses the preamble channel estimation value, and compensates the preamble channel estimation value.

An estimation controller 310 provides information needed for channel estimation to the channel estimator 305. It controls a multiplexer (MUX) 327 to select a channel estimation result and controls the estimation buffer 315 to identify estimation values input thereto and stores them.

Also, the estimation controller 310 transmits PUSC symbol selection information to the preamble phase compensator 320 so that the preamble phase compensator 320 performs a phase compensation process based on the PUSC symbol. The compensation process will be described in detail later with reference to FIG. 5.

An extension controller 325 receives the preamble channel estimation value from the channel estimator 305, determines the number of PUSC symbols using the preamble channel estimation value, and provides it to the estimation controller 310.

Figure 4:
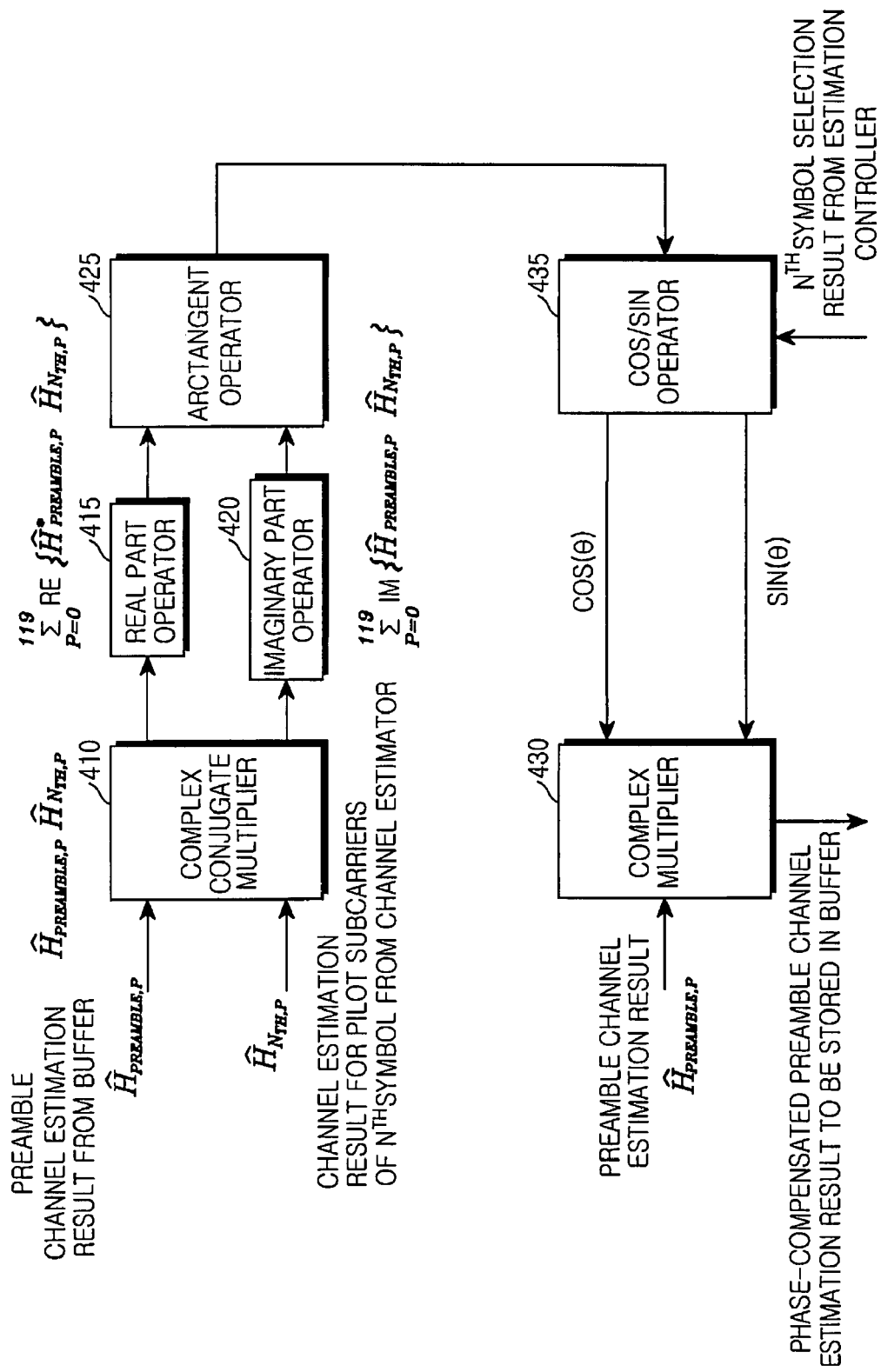
FIG. 4 illustrates a detailed block view of a preamble phase compensator according to the present invention.

FIG. 4 illustrates a detailed block view of a preamble phase compensator according to the present invention.

A complex conjugate multiplier 410 receives the preamble channel estimation result value from the estimation buffer 315 and the channel estimation result value for the pilot subcarriers of the $N^{th}$ PUSC symbol channel from the channel estimator 305, and performs the complex conjugate multiplication based on Equation (5A) to thereby produce a phase difference value between the preamble channel estimation value and the channel estimation value for the pilot subcarriers of the $N^{th}$ PUSC symbol channel. The complex conjugate multiplier 410 provides the phase difference value to a real part operator 415 and an imaginary part operator 420.

The real part operator 415 acquires the real part of the phase difference value between the preamble channel estimation value and the channel estimation value for the pilot subcarriers disposed in the $N^{th}$ PUSC symbol based on Equation (5B) to minimize the deviation of the phase difference value and provides the acquired real part to an Arctangent operator 425.

The imaginary part operator 420 acquires the imaginary part of the phase difference value between the preamble channel estimation value and the channel estimation value for the pilot subcarriers disposed in the $N^{th}$ PUSC symbol based on Equation (5B) to minimize the deviation of the phase difference value and provides the acquired imaginary part to the Arctangent operator 425.

The Arctangent operator 425 performs an arctangent operation on the phase difference values provided by the real part operator 415 and the imaginary part operator 420 to thereby acquire a phase value with minimal deviation, and provides the phase value to a cosine/sine (COS/SIN) operator 435.

Upon receipt of the phase value with the minimal deviation transmitted from the arctangent operator 425, the COS/SIN operator 435 provides an exponential value to be used in Equation (4) to a complex multiplier 430 to compensate the preamble channel estimation value for the estimation of the $N^{th}$ PUSC symbol.

The complex multiplier 430 receives the exponential value from the COS/SIN operator 435 and compensates the preamble channel estimation value based on Equation (4).

The extension controller 325 shown in FIG. 3 determines the time-varying characteristic of a channel based on the preamble channel estimation value of each frame, and decides PUSC symbol number "N" obtained by using the preamble channel estimation result and transmits the PUSC symbol number "N" to the estimation controller 310.

Although a channel changes slowly, the application range of the preamble channel estimation result cannot be extended to the rear part of a frame. This is because a phase difference between a preamble and a data symbol can be normally obtained only when the data symbol is a PUSC symbol.

As an example, when it is regarded that a preamble channel estimation value can be applied to the $10^{th}$ data symbol without a problem after the time-varying characteristic of a channel is observed, and zone switching occurs in the $7^{th}$ symbol and a symbol of another permutation, which is not a PUSC symbol, is transmitted, the preamble channel estimation value should be applied only up to the $6^{th}$ symbol.

Figure 5:
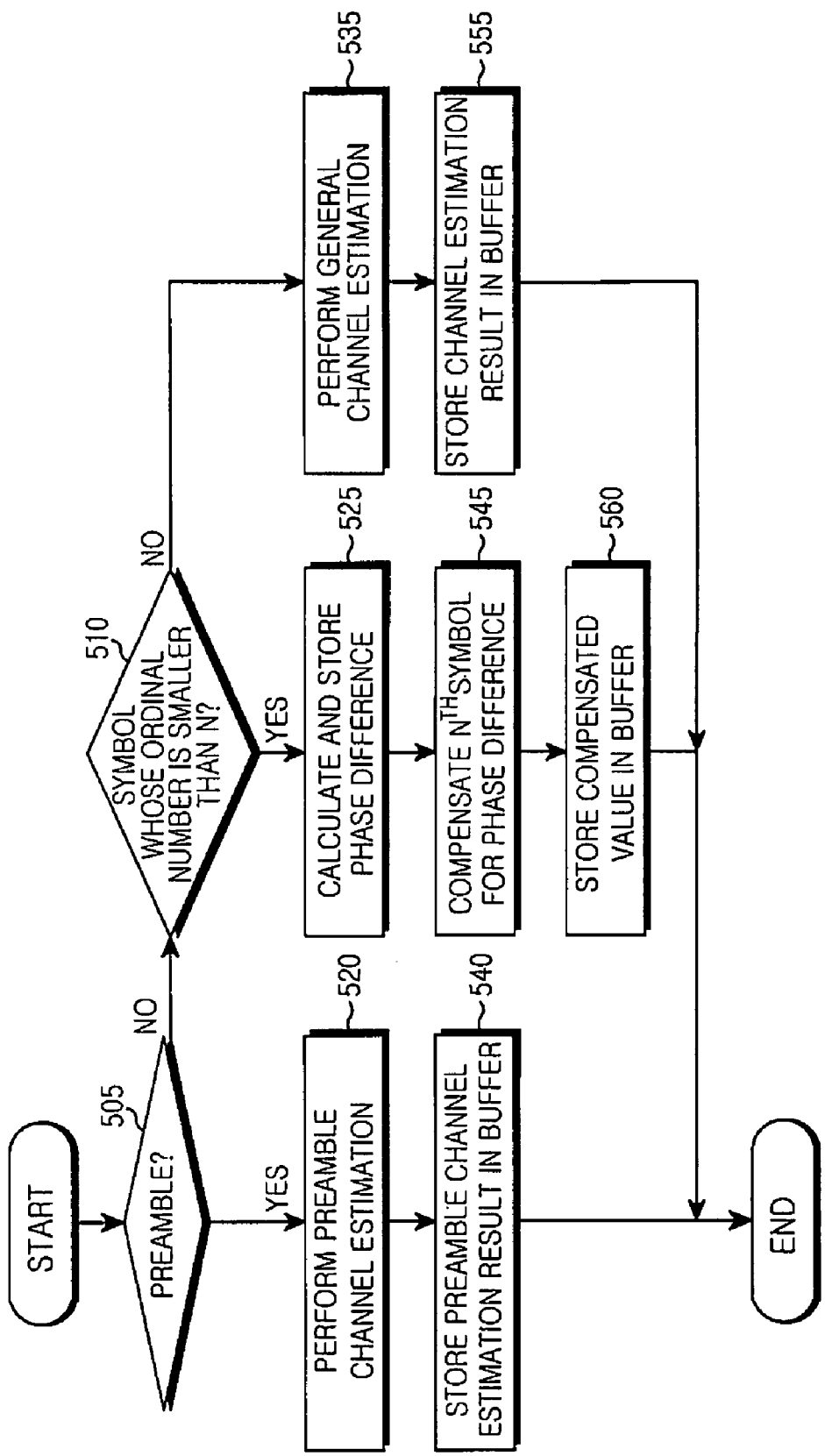
FIG. 5 is a flowchart describing a channel estimation process for demodulating a preamble and PUSC symbols in a broadband wireless communication system according to the present invention.

FIG. 5 is a flowchart describing a channel estimation process for demodulating preambles and PUSC symbols in a broadband wireless communication system according to the present invention.

Referring to FIG. 5, when a preamble is input into the channel estimator 305 in step 505, the channel estimator 305 performs channel estimation on the preamble in step 520 and then stores the channel estimation result in the estimation buffer 315 in step 540.

When the $N^{th}$ PUSC symbol is input into the channel estimator 305 in step 510 after the preamble is input, the channel estimator 305 acquires the phase difference between the preamble channel estimation value, which is already stored in the estimation buffer 315, and the channel estimation value for the pilot subcarriers of the $N^{th}$ PUSC symbol based on Equations (5A) and (5B), and stores the phase difference value in a register in step 525.

In step 545, the preamble channel estimation value is compensated for the estimation of the $N^{th}$ PUSC symbol by using the phase difference value obtained in the step 525 and Equation (4). In step 560, the compensated preamble channel estimation value is stored in the estimation buffer 315.

If the $N^{th}$ PUSC symbol is input through the downlink and the $(N+1)^{th}$ symbol is input into the channel estimator 305, the channel estimator 305 normally performs channel estimation by using the pilot subcarriers included in the data symbol in step 535, stores the result in the estimation buffer 315 in step 555, and terminates the process.

Conventionally, when FCH and DL-MAP are demodulated, pilot subcarriers in the Nth PUSC symbol have been used to estimate the channel of the $N^{th}$ PUSC symbol. However, the present invention described above can improve channel estimation performance for demodulation of FCH and DL-MAP in a broadband wireless access system by performing channel estimation based on a preamble obtained by compensating for phase rotation.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A channel estimation apparatus for a wireless access system, comprising:
   a channel estimator for performing channel estimation on a received symbol to thereby output a channel estimation result;
   an estimation buffer for storing the channel estimation result obtained in the channel estimator and a channel estimation result that is compensated in a preamble phase compensator; and
   the preamble phase compensator for receiving a channel estimation result for pilot subcarriers of a data symbol among the channel estimation result obtained in the channel estimator, receiving a preamble channel estimation result from the estimation buffer, acquiring a phase rotation value between the channel estimation result for pilot subcarriers and the preamble channel estimation result, compensating the preamble channel estimation result with the phase rotation value, and storing the compensated preamble channel estimation result in the estimation buffer.

2. The channel estimation apparatus of claim 1, further comprising:
   an estimation controller for providing the channel estimator with information needed for channel estimation, providing the estimation buffer with information needed for input/output control, and providing the preamble phase compensator with symbol selection information; and an extension controller for receiving the channel estimation result from the channel estimator, analyzing a time-varying characteristic of a current radio channel, determining up to what data symbol in the symbol sequence of a fore part of a frame the preamble channel estimation result is to be used, and providing the estimation controller with the determination result.

3. The channel estimation apparatus of claim 1, wherein the data symbol is a Partial Use of SubChannel (PUSC) symbol.

4. A preamble phase compensator for compensating a phase of a preamble channel estimation result in channel estimation in a wireless access system, comprising:

a first module for receiving a preamble channel estimation result and an $N^{th}$ data symbol channel estimation result and outputting a phase rotation value; and a second module for receiving the phase rotation value and outputting a phase-compensated preamble channel estimation result, wherein the second module further comprises:

a cosine/sine (COS/SIN) operator for outputting an exponential value to compensate the preamble channel estimation result based on the phase rotation value output by an arctangent operator, upon a symbol selection direction of a estimation controller.

5. The preamble phase compensator of claim 4, wherein the first module further comprises:

a complex conjugate multiplier for receiving the preamble channel estimation result and a channel estimation result for pilot subcarriers of the $N^{th}$ data symbol, performing a complex conjugate multiplication to thereby produce a phase difference value between the preamble channel estimation result and the channel estimation result for the pilot subcarriers of the $N^{th}$ data symbol, and providing the phase difference value to a real part operator and an imaginary part operator, individually.

6. The preamble phase compensator of claim 5, wherein the complex conjugate multiplier performs complex conjugate multiplication on the preamble channel estimation result and the channel estimation result for the pilot subcarriers of the $N^{th}$ data symbol based on $$\hat{\theta} = \angle \hat{H}^*_{preamble} \hat{H}_{N^{th}}$$

where H denotes a channel matrix, $\hat{\theta}$ denotes a phase difference, $H^*_{preamble}$ denotes a preamble channel estimate and $\hat{H}_{Nth}$ denotes a channel estimate for an Nth PUSC symbol.

7. The preamble phase compensator of claim 5, wherein the first module further comprises:

the real part operator for acquiring a real part of a phase difference value between the preamble channel estimation result and the channel estimation result for the pilot subcarriers of the $N^{th}$ data symbol from the complex conjugate multiplier to minimize the phase difference; and the imaginary part operator for acquiring an imaginary part of a phase difference value between the preamble channel estimation result and the channel estimation result for the pilot subcarriers of the $N^{th}$ data symbol from the complex conjugate multiplier to minimize the phase difference.

8. The preamble phase compensator of claim 7, wherein the real part operator and the imaginary part operator acquire the real part and the imaginary part of the phase difference value provided by the complex conjugate multiplier based on $$\hat{\theta} = \angle \sum_{p=0}^{119} \hat{H}^*_{preamble,p} \hat{H}_{N^{th},p}$$

where H denotes a channel matrix, $\hat{\theta}$ denotes a phase difference, $\hat{H}^*_{preamble,p}$ denotes a channel estimate for a pilot subcarriers of a preamble and $\hat{H}_{N^{th},p}$ denotes a channel estimate for pilot subcarriers of an Nth PUSC symbol.

9. The preamble phase compensator of claim 7, wherein the first module further comprises:

an arctangent operator for performing an arctangent operation based on the real part and the imaginary part provided by the real part operator and the imaginary part operator, respectively, to thereby output a phase rotation value with a minimized deviation.

10. The preamble phase compensator of claim 4, wherein the $N^{th}$ data symbol is a Partial Use of Subchannel (PUSC) symbol.

11. The preamble phase compensator of claim 4, wherein the COS/SIN operator provides a complex multiplier with the exponential value to be used in complex multiplication for compensating the preamble channel estimation result to estimate a channel of the $N^{th}$ data symbol.

12. The preamble phase compensator of claim 4, wherein the second module further comprises:

a complex multiplier for compensating the preamble channel estimation result based on the exponential value output from the COS/SIN operator.

13. The preamble phase compensator of claim 12, wherein the complex multiplier compensates the preamble channel estimation result to estimate the $N^{th}$ data symbol based on $$\hat{H}_{comp} = \hat{H}_{preamble} e^{j\hat{\theta}}$$

where H denotes a channel matrix, $\hat{H}_{comp}$ denotes a compensation of phase difference of a preamble channel in order to estimate a PUSC symbol, $\hat{H}_{preamble}$ denotes a preamble channel estimate, and $\hat{\theta}$ denotes a phase difference.

14. A channel estimation method in a wireless access system, comprising:

receiving a preamble of a downlink frame and storing a preamble channel estimation result in a buffer; and receiving a data symbol of the downlink frame after the preamble channel estimation result is stored in the buffer, acquiring a phase difference value between the preamble channel estimation result and a channel estimation result for pilot subcarriers of the data symbol, compensating a phase rotation value of the preamble channel estimation result, and storing the compensated preamble channel estimation result in the buffer, wherein the step of compensating the phase rotation value of the preamble channel estimation result and storing the compensated preamble channel estimation result in the buffer comprises:

acquiring the phase difference value between the preamble channel estimation result and the channel estimation result for the pilot subcarriers of an $N^{th}$ data symbol after the preamble channel estimation result is stored, when an $N^{th}$ data symbol of the downlink frame is received; and storing the phase difference value in a register, compensating the preamble channel estimation result with the phase rotation value based on the phase difference value with respect to the $N^{th}$ data symbol, and storing the compensated preamble channel estimation result in the buffer.

15. The channel estimation method of claim 14, wherein the step of compensating the phase rotation value of the preamble channel estimation result and storing the compensated preamble channel estimation result in the buffer further comprises:
performing a general channel estimation process and storing the result in the buffer, after the preamble channel estimation result is compensated with the phase rotation value with respect to the $N^{th}$ data symbol and then the $(N+1)^{th}$ and subsequent symbols are received.

16. The channel estimation method of claim 14, wherein the phase difference value between the preamble channel estimation result and the channel estimation result for pilot subcarriers of an $N^{th}$ data symbol is acquired based on $$\hat{\theta} = \angle \hat{H}^*_{preamble} \hat{H}_{Nth}$$

$$\hat{\theta} = \angle \sum_{p=0}^{119} \hat{H}^*_{preamble,p} \hat{H}_{Nth,p}$$

where H denotes a channel matrix, $\hat{\theta}$ denotes a phase difference, $\hat{H}^*_{preamble}$ denotes a preamble channel estimate, $\hat{H}_{Nth}$ denotes a channel estimate for an $N_{th}$ PUSC symbol, $\hat{H}^*_{preamble,p}$ denotes a channel estimate for a pilot subcarriers of a preamble and $\hat{H}_{N^{th},p}$ denotes a channel estimate for pilot subcarriers of $N_{th}$ PUSC symbol.

17. The channel estimation method of claim 14, wherein when the $N^{th}$ data symbol of the downlink frame is received, the preamble channel estimation result is compensated with the phase rotation value with respect to the $N^{th}$ data symbol based on the phase difference value stored in the register and on $$\hat{H}_{comp} = \hat{H}_{preamble} e^{j\hat{\theta}}$$

where H denotes a channel matrix, $\hat{H}_{comp}$ denotes a compensation of phase difference of a preamble channel in order to estimate a PUSC symbol, $\hat{H}_{preamble}$ denotes a preamble channel estimate and $\hat{\theta}$ denotes a phase difference.

18. The channel estimation method of claim 14, wherein the data symbol is a PUSC symbol.

19. A phase compensation method for compensating a preamble channel estimation result from a preamble phase compensator when channel estimation is performed in a wireless access system, comprising:
receiving a preamble channel estimation result and a channel estimation result for pilot subcarriers of an $N^{th}$ data symbol and outputting a phase rotation value; and
receiving the phase rotation value result and outputting a phase-compensated preamble channel estimation result,
wherein the step of receiving the preamble channel estimation result and the channel estimation result for pilot subcarriers of the $N^{th}$ data symbol and outputting the phase rotation value further comprises:

receiving the preamble channel estimation result from an estimation buffer and the channel estimation result for pilot subcarriers of the $N^{th}$ data symbol from a channel estimator, performing complex conjugate multiplication to thereby output a phase difference value, and providing the phase difference value to a real part operator and an imaginary part operator, individually, in a complex conjugate multiplier, and
acquiring a real part and an imaginary part of the phase difference value between the preamble channel estimation result and the channel estimation result for pilot subcarriers of the $N^{th}$ data symbol, and providing the real part and the imaginary part to an arctangent operator to minimize deviation of the phase difference value in the real part operator and the imaginary part operator.

20. The phase compensation method of claim 19, wherein the complex conjugate multiplier performs complex conjugate multiplication on the preamble channel estimation result and the channel estimation result for pilot subcarriers of the $N^{th}$ data symbol based on $$\hat{\theta} = \angle \hat{H}^*_{preamble} \hat{H}_{N^{th}}$$

where H denotes a channel matrix, $\hat{\theta}$ denotes a phase difference, $\hat{H}^*_{preamble}$ denotes a preamble channel estimate and $\hat{H}_{Nth}$ denotes a channel estimate for an Nth PUSC symbol.

21. The phase compensation method of claim 19, wherein the real part operator and the imaginary part operator acquire the real part and the imaginary part of the phase difference value provided by the complex conjugate multiplier based on $$\hat{\theta} = \angle \sum_{p=0}^{119} \hat{H}^*_{preamble,p} \hat{H}_{N^{th},p}$$

where H denotes a channel matrix, $\hat{\theta}$ denotes a phase difference, $\hat{H}^*_{preamble,p}$ denotes a channel estimate for a pilot subcarriers of a preamble and $\hat{H}_{N^{th},p}$ denotes a channel estimate for a pilot subcarriers of an $N_{th}$ PUSC symbol.

22. The phase compensation method of claim 19, wherein the step of receiving the preamble channel estimation result and the channel estimation result for pilot subcarriers of the $N^{th}$ data symbol and outputting the phase rotation value further comprises:
performing an arctangent operation in the arctangent operator that receives the real part and the imaginary part of the phase difference value to thereby output the phase rotation value with the minimized deviation.

23. The phase compensation method of claim 19, wherein the $N^{th}$ data symbol is a PUSC symbol.

24. The phase compensation method of claim 22, wherein the step of receiving the phase rotation value and outputting a phase-compensated preamble channel estimation result further comprises:
performing the arctangent operation in the arctangent operator that receives the real part and the imaginary part of the phase difference value to thereby output the phase rotation value with the minimized deviation, and providing a COS/SIN operator with the phase rotation value with the minimized deviation.

25. The phase compensation method of claim 24, wherein the step of receiving the phase rotation value and outputting the phase-compensated preamble channel estimation result further comprises:
providing an exponential value from the COS/SIN operator that receives the phase rotation value with the minimized deviation to a complex multiplier upon a symbol selection direction of estimation controller.

26. The phase compensation method of claim 25, wherein the COS/SIN operator provides the complex multiplier with the exponential value to be used in complex multiplication for compensating the preamble channel estimation result to estimate a channel of the $N^{th}$ data symbol.

27. The phase compensation method of claim 25, wherein the step of receiving the phase rotation value and outputting the phase-compensated preamble channel estimation result further comprises:
compensating the preamble channel estimation result using the exponential value and storing the compensated preamble channel estimation result into an estimation buffer, in the complex multiplier.

28. The phase compensation method of claim 27, wherein the complex multiplier compensates the preamble channel estimation result to estimate the channel of the $N^{th}$ data symbol based on $$\hat{H}_{comp} = \hat{H}_{preamble} e^{j\hat{\theta}}$$

where H denotes a channel matrix, $\hat{H}_{comp}$ denotes a compensation of phase difference of a preamble channel in order to estimate a PUSC symbol $\hat{H}_{preamble}$ denotes a preamble channel estimate, and $\hat{\theta}$ denotes a phase difference.

* * * * *